(12) United States Patent
Hathcock

(10) Patent No.: US 6,877,300 B1
(45) Date of Patent: Apr. 12, 2005

(54) HORSE BLANKET

(76) Inventor: H. Glen Hathcock, 205 Mikus Rd., Weatherford, TX (US) 76087

(*) Notice: Subject to any disclaimer, the term of this patent is extended or adjusted under 35 U.S.C. 154(b) by 0 days.

(21) Appl. No.: 10/669,737

(22) Filed: Sep. 24, 2003

(51) Int. Cl.[7] ................................................. B68C 5/00
(52) U.S. Cl. ...................................................... 54/79.2
(58) Field of Search ................................. 54/79.1, 79.2, 54/79.4; 119/850; D30/144, 145

(56) References Cited

U.S. PATENT DOCUMENTS

| 185,201 | A | | 12/1876 | Adams |
| 805,925 | A | * | 11/1905 | Meyers ........................ 54/79.2 |
| 3,839,845 | A | | 10/1974 | Hickey |
| 4,355,600 | A | | 10/1982 | Zielinski |
| 4,955,182 | A | | 9/1990 | Newman |
| 5,161,352 | A | * | 11/1992 | Schneider et al. ............ 54/79.2 |
| 5,271,211 | A | | 12/1993 | Newman |
| 5,839,395 | A | | 11/1998 | Kelley et al. |
| D423,737 | S | * | 4/2000 | MacGuinness ............. D30/145 |
| 6,318,054 | B1 | * | 11/2001 | Gatto ........................... 54/79.4 |
| 6,408,604 | B1 | * | 6/2002 | Schneider .................... 54/79.1 |
| 6,467,244 | B1 | | 10/2002 | Kelley et al. |

FOREIGN PATENT DOCUMENTS

EP    0 595 423 A1    5/1994

* cited by examiner

Primary Examiner—Teri Pham Luu
Assistant Examiner—Elizabeth Shaw
(74) Attorney, Agent, or Firm—Geoffrey A. Mantooth

(57) ABSTRACT

A horse blanket has a back portion and side portions that extend down from the back portions. The side portions couple to each other at a front chest area. The straps that couple the chest area side portions together are elasticized. A neck opening above the chest area is elasticized around the entire circumference. The areas of the blanket near the horse's front legs are also elasticized. The elastic portions allow the blanket to fit snuggly around the horse's neck and front area, while allowing flexibility for the horse to exercise.

8 Claims, 3 Drawing Sheets

HORSE BLANKET

FIELD OF THE INVENTION

The present invention relates to blankets for covering and protecting animals such as horses.

BACKGROUND OF THE INVENTION

During the winter months, horses are turned out to pasture to feed on grass and hay and to exercise. In order to keep their horses warm and dry, many owners provide turnout blankets. The blanket covers the back of the horse, from the neck to the tail and drapes down along the sides of the horse. The belly of the horse typically remains exposed, while the chest area, beneath the front of the neck, is typically covered. The horse blanket has an opening for receiving the horse's neck.

In addition, in some locales, a blanket is provided for a horse in a barn or stable as many barns are unheated. These are known as stable blankets.

Conventional horse blankets are sized according to the length of the horse, from the center of the chest to the beginning, or root, of the tail. Thus, a size 80 blanket would fit a bigger horse than, say, a size 75 blanket. However, the neck openings are sized to fit the biggest horse upon which the blanket would fit. Some horses, such as quarter horses, have stocky necks. The neck opening of the blanket is sized to fit around such stocky necks.

Unfortunately, some horses, such as thoroughbreds, are more delicate and have thinner necks. Consequently, the neck openings of the blankets fit more loosely around a thoroughbred's neck. A loose fitting neck allows wind to blow air and rain inside of the blanket through the neck opening, defeating the purpose of the blanket.

Furthermore, turnout blankets are subject to wear and tear by the horse. As the horse exercises and moves, the blanket is stressed at certain points or areas, namely the areas of attachment to the horse. The blanket tears at these attachment areas, resulting in an ill-fitting blanket or a blanket that completely falls off the horse.

SUMMARY OF THE INVENTION

It is an object of the present invention to provide a horse blanket with a neck opening that fits snuggly regardless of the size of the horse's neck.

It is a further object of the present invention to provide a horse blanket that minimizes tearing and wear and will cover a horse snuggly.

The horse blanket of the present invention comprises a back portion having a neck end and a tail end. Side portions are arranged to depend from the back portion when the blanket is on a horse. The side portions extend from the tail end to a chest area. The side portions are removably coupled together at the chest area. A neck opening is located between the neck end of the back portion and the chest area. The edge of the neck opening is elasticized for substantially the entire circumference of the neck opening.

In accordance with one aspect of the present invention, the neck opening is elasticized at a stretch-to-relaxation ratio of at least 10:9.

In accordance with another aspect of the present invention, the side portions of the blanket are removably coupled together at the chest area by way of hook and loop fasteners.

In accordance with still another aspect of the present invention, the side portions are removably coupled together at the chest area by at least one strap and fastener.

In accordance with still another aspect of the present invention, at least some portion of the strap or fastener is elasticized.

In accordance with yet another aspect of the present invention, the blanket further comprises a gusset in a front leg area of each of the side portions, with the gusset being elasticized.

The present invention also provides a horse blanket comprising a back portion having a neck end and a tail end. Side portions are arranged to depend from the back portion when the blanket is on a horse. The side portions extend from the tail end to a chest area. The side portions are removably coupled together at the chest area. Each of the side portions have an area located in proximity to a front leg of the horse when the blanket is on the horse. A neck opening is located between the neck end of the back portion and the chest area. Each side portion has a gusset located in a front leg area, with the gusset being elasticized.

In accordance with another aspect of the present invention, the side portions are removably coupled together at the chest area by way of at least one strap and fastener, with some portion of the strap or fastener being elasticized.

DESCRIPTION OF THE PREFERRED EMBODIMENT

Figure 1:
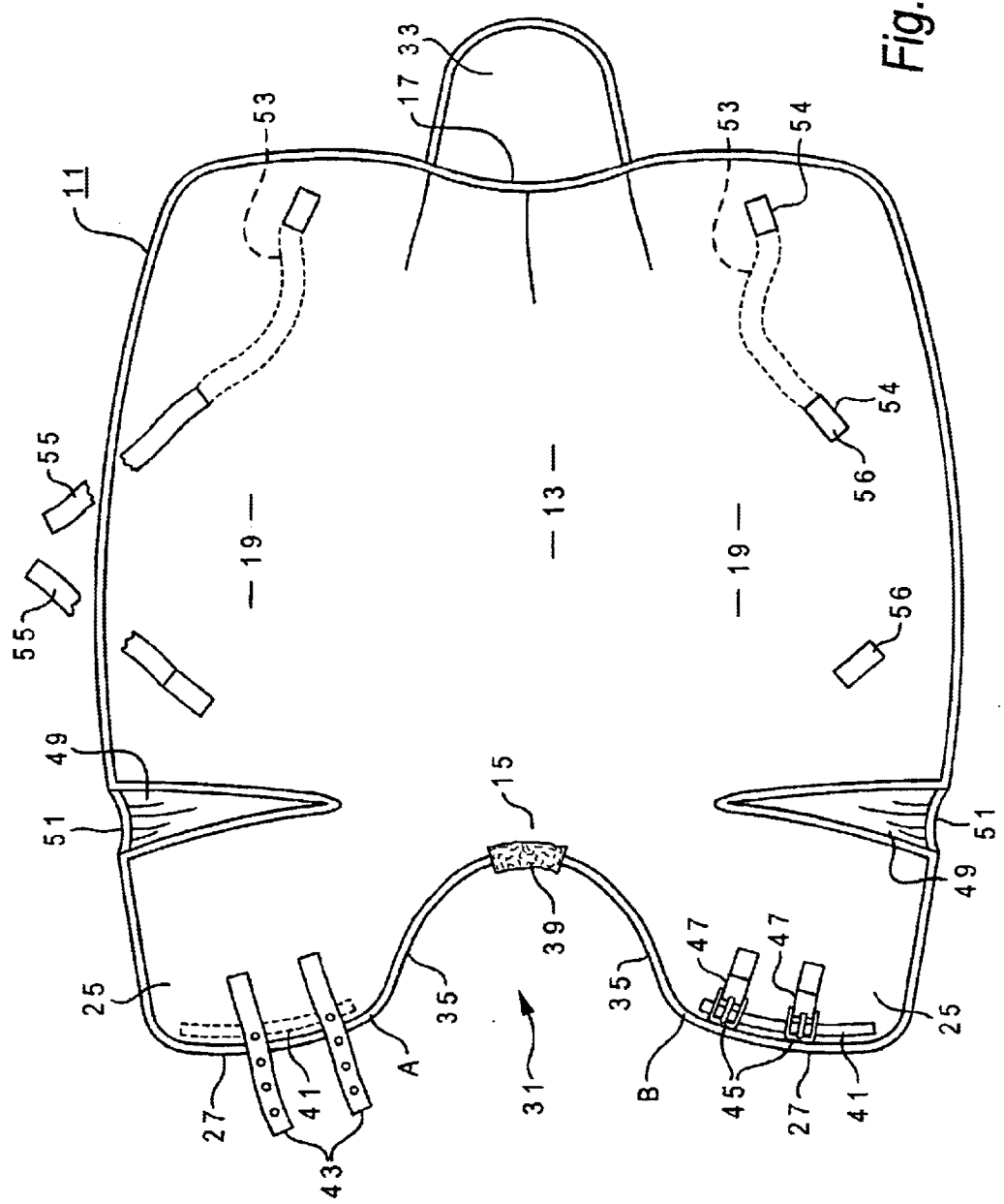
FIG. 1 is a plan view of a horse blanket of the present invention, in accordance with a preferred embodiment.
Figure 2:
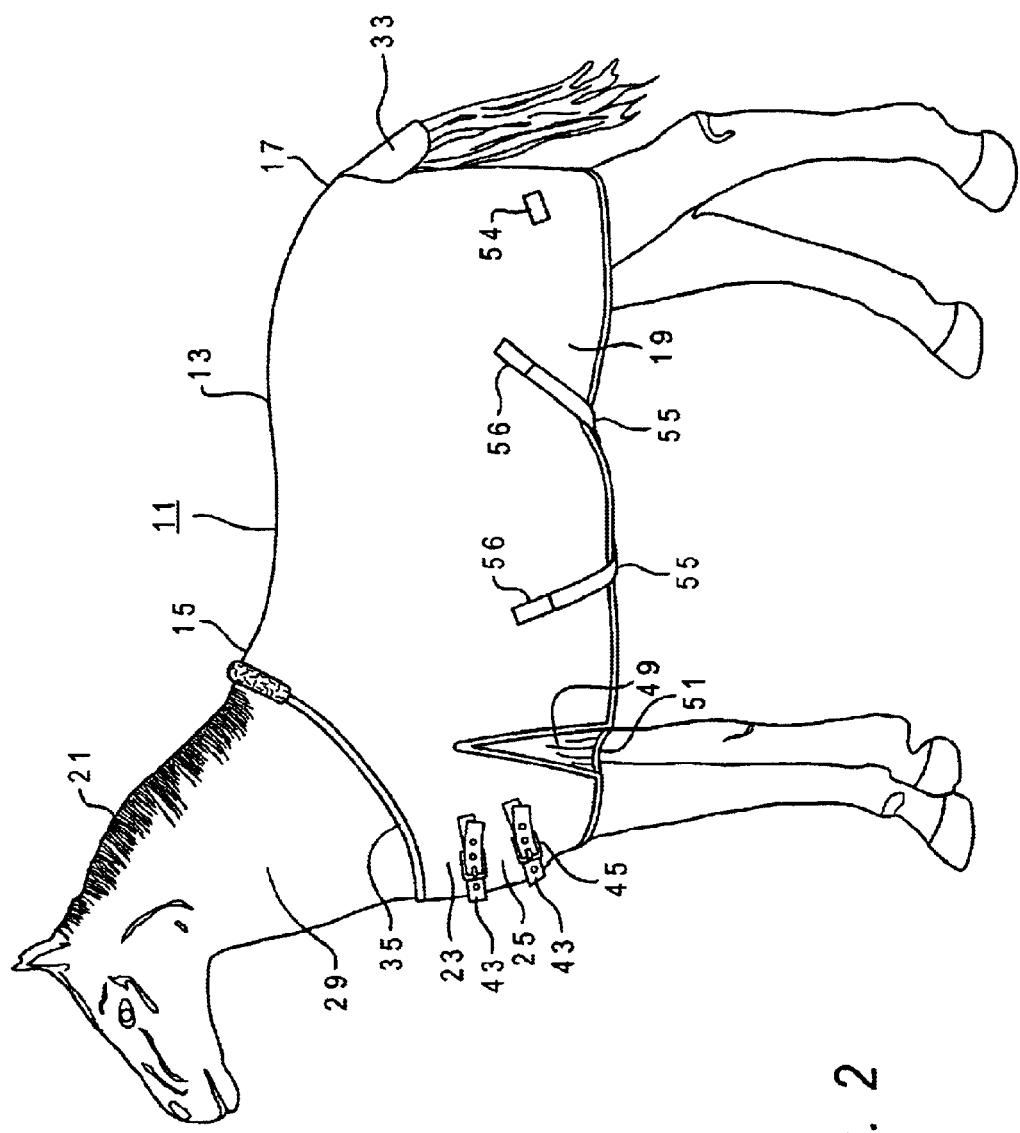
FIG. 2 is a side view of the blanket of FIG. 1, shown on a horse.

In FIGS. 1 and 2, there is shown the horse blanket 11 of the present invention, in accordance with a preferred embodiment. The blanket 11 is a turnout blanket, suitable for use on a horse that is turned out to pasture and exposed to the weather.

The blanket 11 can be made out of a variety of materials. For example, in the preferred embodiment, the turnout blanket is made of a waterproof nylon outer layer, a nylon liner or inner layer and a polyfill insulation in between. However, other materials besides nylon and polyfill can be used. For example, the outer layer need not be waterproof. This is particularly true if the blanket is a stable blanket and meant for use inside of a stable or barn. Furthermore, the blanket can be made out of a variety of materials of different weights.

The blanket 11 has a back portion 13 that extends between a neck end 15 and a tail end 17 of the blanket. Side portions 19 extend from the back portion 13. When the blanket 11 is on a horse 21, the back portion 11 extends along the back of the horse, while the side portions 19 depend down along the sides of the horse. The side portions 19 extend from the tail end 17 to a chest area 23 of the horse. The side portions 19 have front flaps 25. The flaps 25 have front edges 27 that are designed to overlap slightly; the flaps 25 cover the chest area or front area 23 of the horse below the neck 29. A neck opening 31 is formed in the blanket between the front flaps 25 and the neck end 15 of the back portion. The blanket can have a tail flap 33 at the tail end 17.

The edge 35 of the blanket that defines the neck opening 31 is shown in FIG. 1, and extends from point A to point B. The neck opening edge 35 is elasticized from point A to point B to allow the neck opening to stretch. When the flaps 25 are closed and overlapping, the entire circumference of the neck opening is elasticized. Thus, point A overlaps point B. If the neck is particularly large, point A may be separated from point B by a short distance, wherein the neck opening is elasticized for substantially the entire circumference.

In the preferred embodiment, the stretch-to-relaxation elastic ratio is 10:9, meaning that when the edge 35 is stretched to a 10 inch length, the edge is 9 inches upon relaxation. This is a relatively loose fit, as the neck opening is not too constricting around the horse. If the ratio is smaller, such as 10:7, then the blanket irritates the horse because the neck opening feels too constricting to the horse.

A length of lamb fleece 39 can be optionally added along a portion of the neck opening, where the blanket contacts the mane of the horse.

The two side flaps 25 couple together with hook and loop fasteners 41. A strip of hooks is on one flap 25 and a strip of loops is located inside of another flap. When the flaps 25 overlap, the hook and loop fasteners 41 retain the flaps in place. Front straps 43 on one flap 25 are then secured to buckles 45 on the other flap. The straps provide a more secure coupling than the hook and loop fasteners. The strap and buckle arrangements are elasticized. In the preferred embodiment, the straps 43 are nylon webbing and the buckles 45 are secured to the blanket material by elastic straps 47. Thus, the strap connection to the blanket material has elasticity.

The blanket 11 is also fitted with gussets 49 at the side portions 19, near the front legs of the horse. Each gusset 49 is a wedge-shaped piece of material, gathered along the bottom edge 51. The bottom edge 51 is elasticized. In the preferred embodiment, the bottom edge of the gusset has an elastic stretch-to-relaxation ratio of 10:5.

In addition, rear leg straps 53 are provided on the inside of the blanket. These rear leg straps 53 are elastic and are adjustable in length. The rear leg straps extend around the inside of the rear legs of the horse. The ends of the rear leg straps clip on to rings or other attachment devices which are secured to the blanket by webbing 54 and stitching.

Furthermore, at least one elastic belly band 55 or belly strap is provided. In the preferred embodiment, two belly straps 55 are provided, one located close to the front legs and the other located closer to the rear legs. The belly straps extend underneath the belly of the horse. The length of each belly strap is adjustable and the ends are clipped or hooked to rings or other attachment devices 56 on the blanket (for example, Malaysian hooks).

The blanket 11 is sized to fit on a horse by measuring from the center of the chest to the tip of the tail. Once sized, the blanket 11 is put onto the back and sides of the horse. The front flaps 25 are overlapped and secured with the hook and loop fasteners 41. The front straps 43 are secured to the buckles 45. The belly straps 55 and the rear leg straps 53 are then adjusted and secured.

The blanket fits snuggly to the horse. The edge 35 of the neck opening 31 fits close around the horse's neck, with the elastic closing off any openings between the horse and the blanket. Thus, the blanket is suited for use on a variety of horses such as quarter horses with thick necks and thoroughbreds with thinner necks. When a horse is out in a pasture exposed to adverse weather, wind and rain are unable to enter the neck opening due to the close fit.

Likewise, the sides of the blanket fit close for the horse to provide a snug fit. The chest straps 43 and side gussets 49 provide a snug fit to the front portions of the horse.

Yet, the blanket 11 allows the horse to exercise. The stress areas are elasticized. For example, if the horse walks or runs, the front legs are not constricted because the gussets 49, with the elasticized bottom edges 51 and gathered material, provide flexibility to the blanket in the area of the front legs. The horse is thus able to move its front legs without being constricted to an unpleasant degree by the front aspects of the blanket. When the horse stops running or walking, the blanket returns to its snug fit around the front legs of the horse. The rear legs are generally unconstricted by the blanket; and in any event, the elastic rear leg straps provide flexibility.

If the horse bends its head down to eat at ground level, the neck opening 31 provides flexibility. In a conventional, tight-necked blanket, the neck tends to push down on the bottom of the neck opening and pull on the top of the neck opening. With the blanket of the present invention, the horse is thus able to eat without feeling choked around the bottom of the neck opening. When the horse returns to its up position, the neck opening 31 continues to provide a snug fit.

The elasticized neck opening, front straps and front leg gussets provide flexibility at the stress areas of the blanket. Consequently, the straps, and their attachments to the blanket, are less likely to break or pull out from the blanket, thereby increasing the durability of the blanket. In addition, the horse is content with a blanket that does not restrict exercise, while remaining snug to keep the horse warm and dry.

Figure 3:
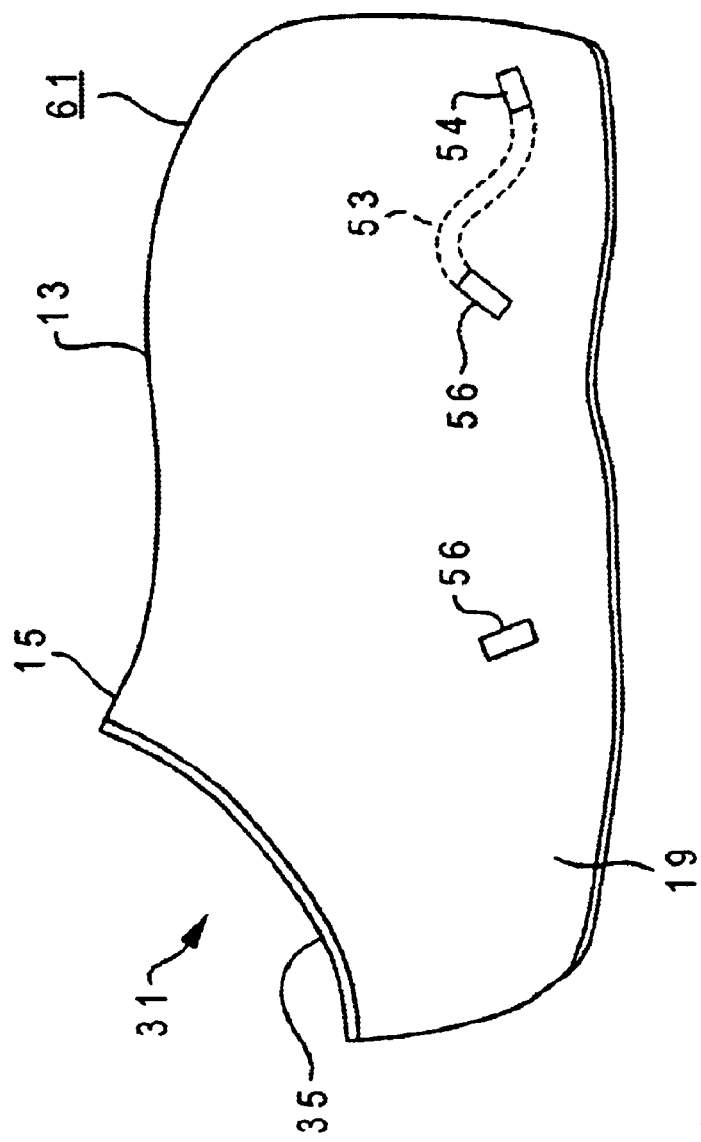
FIG. 3 is a side view of a horse stable blanket, in accordance with another embodiment.

FIG. 3 illustrates another embodiment of the blanket 61. The blanket is a stable blanket. Stabled horses typically engage in little or no exercise. The blanket has an elasticized neck opening 31. The blanket has no front leg area gussets. Also, the front straps (not shown) need not be elasticized.

Many stables are unheated. Thus, owners provide blankets for their horses in cold weather. The elasticized neck opening allows the horse to lower its head to feed, while maintaining a snug fit when the head returns to an elevated position. The back portion 13 of the stable blanket forms a contoured fit to the horse's back.

The foregoing disclosure and showings made in the drawings are merely illustrative of the principles of this invention and are not to be interpreted in a limiting sense.

What is claimed is:

1. A horse blanket, comprising:
a) a back portion having a neck end and a tail end;
b) side portions arranged to depend from the back portion when the blanket is on a horse, the side portions extending from the tail end to a chest area, the side portions being removably coupled together at the chest area;
c) a neck opening located between the neck end of the back portion and the chest area, the edge of the neck opening being elasticized for substantially the entire circumference of the neck opening;
d) a gusset in a front leg area of each of the side portions, the gusset being elasticized.

2. The horse blanket of claim 1, wherein the neck opening is elasticized at a stretch-to-relaxation ratio of at least 10:9.

3. The horse blanket of claim 1, wherein the side portions are removably coupled together at the chest area by way of hook and loop fasteners.

4. The horse blanket of claim 1, wherein the side portions are removably coupled together at the chest area by at least one strap and fastener.

5. The horse blanket of claim 4, wherein some portion of the strap or fastener is elasticized.

6. The horse blanket of claim 1, wherein:
a) the side portions are removably coupled together at the chest area by at least one strap and fastener;
b) some portion of the strap or fastener is elasticized.

7. A horse blanket, comprising:
a) a back portion having a neck end and a tail end;
b) side portions arranged to depend from the back portion when the blanket is on a horse, the side portions extending from the tail end to a chest area, the side portions being removably coupled together at the chest area, each of the side portions having an area located in proximity to a front leg of a horse when the blanket is on a horse;
c) a neck opening located between the neck end of the base portion and the chest area;
d) each side portion having a gusset located in a front leg area, the gusset being elasticized.

8. The horse blanket of claim 7, wherein:
a) the side portions are removably coupled together at the chest area by at least one strap and fastener, with at least some portions of the strap or fastener being elasticized.

* * * * *